United States Patent [19]

Palamountain

[11] 4,218,037
[45] Aug. 19, 1980

[54] REARVIEW MIRROR ASSEMBLY

[75] Inventor: Bruce F. Palamountain, Sunbury, Australia

[73] Assignee: Ford Motor Company, Dearborn, Mich.

[21] Appl. No.: 49,683

[22] Filed: Jun. 18, 1979

[51] Int. Cl.² ............................................. A47G 1/24
[52] U.S. Cl. ................................. 248/481; 74/501 M; 350/307
[58] Field of Search ............... 248/481, 484; 350/307; 74/501 M, 491

[56] References Cited

U.S. PATENT DOCUMENTS

| | | | |
|---|---|---|---|
| 3,442,150 | 5/1969 | Brawner et al. | 248/481 X |
| 3,442,151 | 5/1969 | Brawner et al. | 248/481 X |
| 3,934,489 | 1/1976 | Bottrill | 74/501 M |
| 4,003,271 | 1/1977 | Stelma | 248/481 X |
| 4,076,392 | 2/1978 | Suzuki | 248/481 X |
| 4,101,205 | 7/1978 | Bos | 248/481 X |

FOREIGN PATENT DOCUMENTS

| | | |
|---|---|---|
| 2258296 | 6/1973 Fed. Rep. of Germany | 74/501 M |
| 2256230 | 5/1974 Fed. Rep. of Germany | 74/501 M |
| 2436339 | 2/1976 Fed. Rep. of Germany | 74/501 M |

*Primary Examiner*—J. Franklin Foss
*Attorney, Agent, or Firm*—John J. Roethel; Clifford L. Sadler

[57] ABSTRACT

A self-contained rearview mirror assembly 10 adapted to be mounted at the lower front corner of a vehicle door window opening. The rearview mirror assembly 10 comprises a mirror 21 on a backing plate 22 that has an angularly related hinged flange 23 at one of its ends. A support frame 25 encompasses the backing plate and has an angularly related flange 34 contiguous to the frame flange and having door window frame engageable means for positioning and retaining the mirror assembly on a vehicle door.

Coacting ball and socket means 29–32 provide a pivot means about which the mirror is universally adjustable. An adjusting lever 36 directly coupled to the backing plate flange 21 is operable to tilt the mirror about substantially horizontal and vertical axes. Coacting guide means 45 on contiguous flanges prohibit rotation of the mirror in its own plane about the pivot means.

10 Claims, 8 Drawing Figures

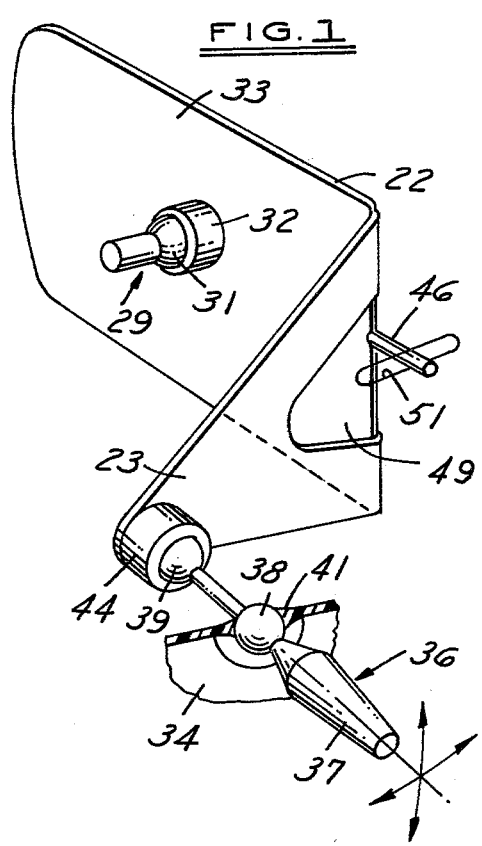
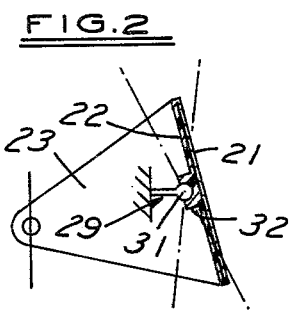
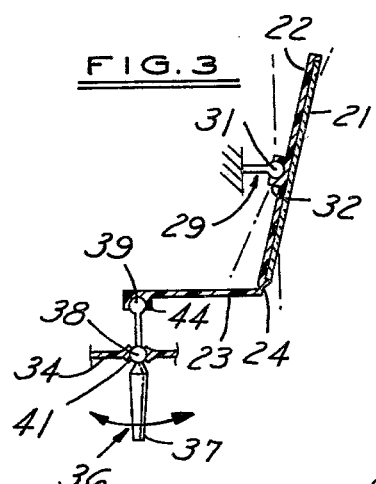
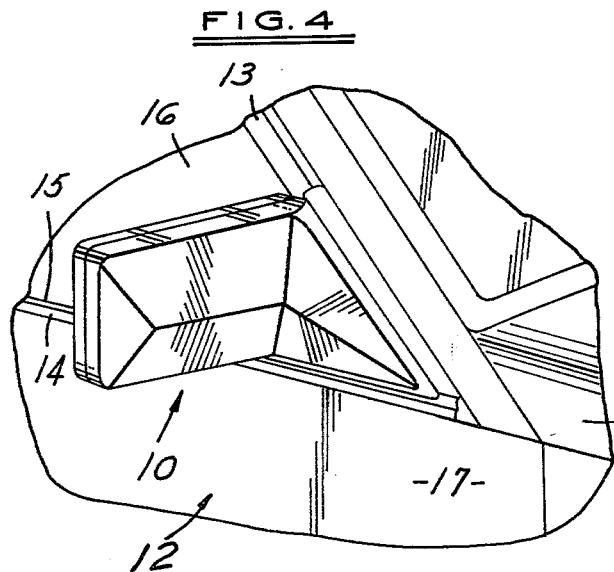
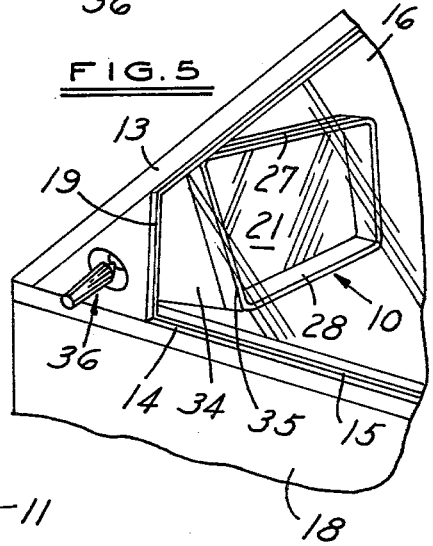

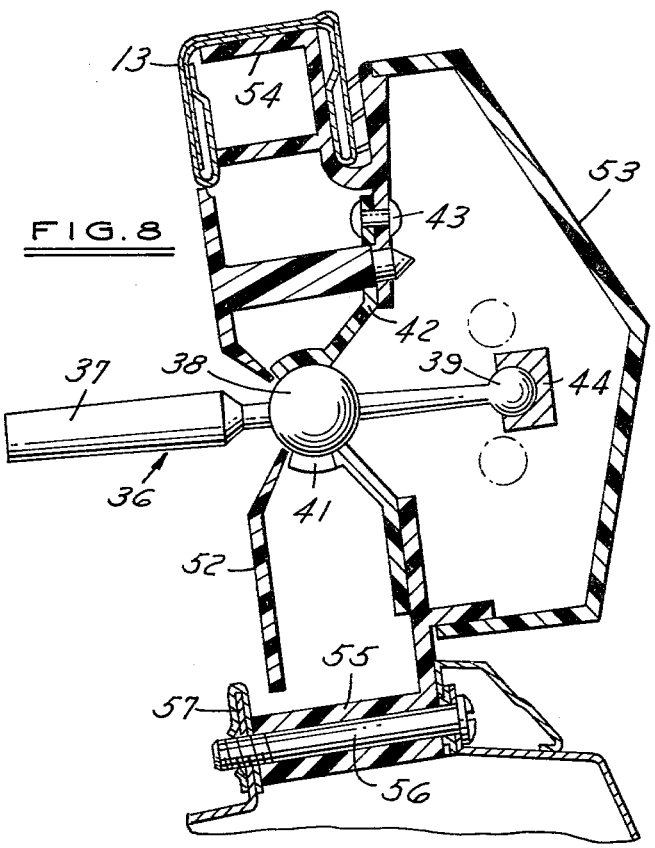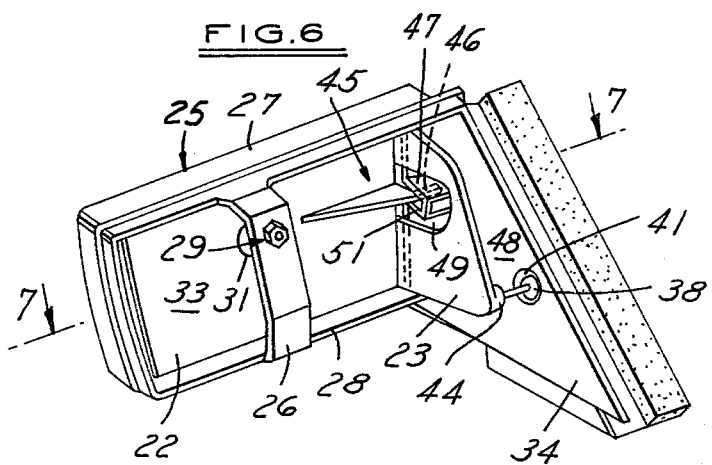

REARVIEW MIRROR ASSEMBLY

BACKGROUND OF THE INVENTION

For a number of years, remotely controlled rearview mirrors have been mounted on an exterior panel of a vehicle side door. Adjustment of the mirror about a ball and socket type of universal mounting between the mirror and the mirror housing has been accomplished by a three-cable control system, such as disclosed in U.S. Pat. No. 4,003,271 issued Jan. 18, 1977 to G. N. Stelma for a "Mirror Assembly", and U.S. Pat. No. 4,027,548 issued June 7, 1977 to J. M. Cummins for a "Remote Control Mirror". In order to reduce the weight and the cost of the remotely controlled rearview mirror assembly, to eliminate the cables as a source of rattling noises and to improve the ability of the mechanism to hold the mirror in an adjusted position against the flutter and vibration caused by road irregularities or even the frequent opening and closing of the vehicle door, the current trend is to make the mirror assembly a self-contained unit adapted to be mounted at the lower front quarter of the vehicle door window opening. In the current production version the mirror is mounted on a ball and socket universal mounting and adjustment is obtained through a short three-cable control system actuated by a lever accessible on the inside of the vehicle window opening. Although the utilization of the window mounted unit eliminates the necessity of punching holes in the exterior panel of the door for the mirror mount and in the interior panel of the door for the actuating lever, some of the disadvantages inherent in the use of the three-cable control system have been carried over into the window units. It has been suggested that these disadvantages could best be cured by elimination of the three cables.

Remote control mirror units that do not use the three-cable system are exemplified by U.S. Pat. No. 3,934,489 issued Jan. 27, 1976 to J. Bottrill for "Rearview Mirrors for Vehicles", and U.S. Pat. No. 4,031,771 issued June 28, 1977 to D. Daley et al for "Vehicle Rear-View Mounting Arrangement." Neither one of the mechanisms disclosed in either of these two patents utilizes the single universally mounted lever for adjusting the positioning of the mirror to which motor vehicle operators familiar with the three-cable mechanisms have become accustomed.

SUMMARY OF THE INVENTION

The present invention relates to a self-contained rearview mirror assembly adapted to be mounted at the lower front quarter of the vehicle door window opening. The rearview mirror assembly comprises a mirror surface on a backing plate that has an angularly related flange at one of its ends. The backing plate and its flange are connected to each other by a hinge means. A support frame encompasses the backing plate and has at one of its ends an angularly related flange having door window frame engageable means for positioning and retaining the mirror assembly on a vehicle door. The backing plate flange and the frame flange are contiguous to each other.

Coacting ball and socket means on the support frame and the backing plate provide a pivot means about which the mirror is universally adjustable. An adjusting lever is mounted on the support frame flange and is directly coupled to the backing plate flange. The lever is operable from the inside of the vehicle door to tilt the mirror about substantially horizontal and vertical axes. Coacting guide means on the backing plate and frame flange prohibit rotation of the mirror in its own plane about the mirror pivot means.

DESCRIPTION OF THE DRAWINGS

Further features and advantages of the present invention will be made more apparent as this description proceeds, reference being had to the accompanying drawings wherein:

FIG. 1 is a perspective view illustrating the key operative components of the rearview mirror assembly embodying the present invention;

FIGS. 2 and 3 are diagramatic views illustrating two basic movements utilized in achieving the desired adjustability of the rearview mirror;

FIGS. 4 and 5 illustrate the relationship of the rearview mirror assembly to the vehicle door on which the unit is adapted to be mounted;

FIG. 6 is a slightly enlarged view of the mirror unit when viewed in the same direction as seen in FIG. 4 with the cover removed;

FIG. 8 is a view taken on the line 8—8 looking in the direction of the arrows.

DETAILED DESCRIPTION OF THE INVENTION

Figure 7:
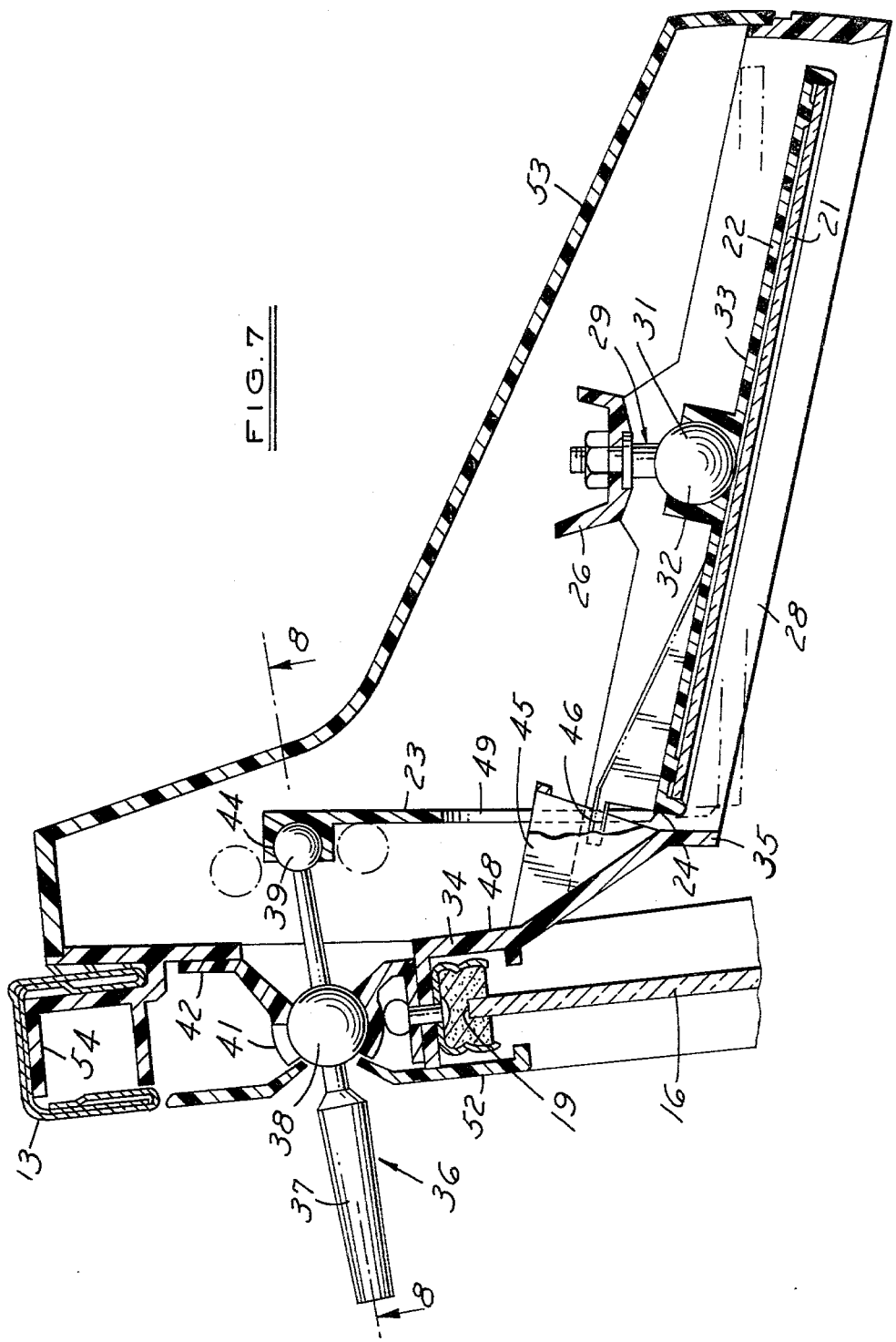
FIG. 7 is an enlarged sectional view taken on the line 7—7 of FIG. 6 looking in the direction of the arrows.

Referring now to the drawings, and more particularly to FIGS. 4 and 5, the rearview mirror assembly, generally designated 10 embodying the present invention, is shown as it appears from both the outside and the inside, respectively, of a motor vehicle body 11. The mirror assembly 10 is mounted in the lower front corner of the vehicle window opening in a vehicle door 12. The conventional vehicle door window opening is framed at the forward upper portion of the door by a frame member 13 that extends upwardly and rearwardly from the door window sill 14. The sill 14 is longitudinally slotted at 15 to receive a window glass 16 which may be raised or lowered out of and into the window well between the outer door panel 17 and the inner door panel 18. The window glass 16 is vertically squared off at its front edge 19 so that in its raised position a substantially triangular opening is provided to receive the rearview mirror assembly structure that passes through the window, as will be more fully explained.

The rearview mirror assembly 10 comprises a mirror 21 supported on a backing plate 22 having a substantially triangular, angularly related, flange 23 at one end. The flange 23 is connected to the backing plate by a hinge 24. The backing plate 22 and its flange 23 preferably are integrally molded of polypropylene plastic. This enables the hinge 24 connection between the two to be a non-mechanical plastic hinge, see FIG. 7, known in the art as a "living hinge". The hinge 24 is of substantially reduced thickness, compared to the thickness of the plate and the flange. The thin plastic section comprising the hinge is able to withstand repeated flexing without becoming brittle and cracking.

A substantially rectangular support frame or casing 25 surrounds the backing plate 22. As best seen in FIG. 6, a bridge 26 extends between the upper and lower frame members 27 and 28, respectively, of the support frame 25. The bridge supports a fixed ball mount 29, the ball portion 31 of which is received in a socket 32 on the back face 33, the side opposite the mirror side, of the backing plate 22. The ball and socket mounting of the backing plate permits limited universal movement of the mirror to a desired angular adjustment position. There is sufficient clearance on all four sides of the backing plate within the casing to permit the latter to move freely.

The support frame or casing 25 has a substantially triangular flange 34 integrally formed with one of its side members 35. The flange 34 extends away from the mirror face or towards the inner section of the door frame member 13 and the window sill 14 when the mirror assembly is installed on the vehicle door. Universal movement of the mirror backing plate 22 about its ball and socket mount 29 is achieved by manipulation of an adjusting lever 36. The lever 36 has a handle portion 37 accessible on the inner side of the window 16, a first ball portion 38 intermediate its ends, and a second ball portion 39 on its end opposite the handle end.

The first ball portion 38 on the lever 36 is received in a fixed socket 41 formed on a mounting plate 42 that is fixed, as by rivets 43, to the vehicle contiguous side of the casing flange 34. The end or second ball portion 39 on the lever 36 has a snap-fit in a socket 44 on the apex end of the backing plate flange 23, the adjusting lever thus being directly coupled to the mirror 21 backing plate 22.

A guide means 45 interposed between the backing plate 22 and the casing flane 34 is provided to inhibit rotation of the mirror 21 in its own plane about the ball mount 29. The guide means 45 comprises a lateral extension 46 on the back face 33 of the backing plate. The extension 46 projects beyond the hinge axis 24 into a slotted member 47 that projects from the face 48 of the casing flange adjacent the backing plate flange 23. The flange 23 has an aperture 49 therein through which the slotted member 47 projects to permit the extension 46 to extend into a horizontal slot 51 therein. Preferably, the longitudinal axis of the extension 46 lies in a plane passing through the longitudinal axis of the ball mount 29.

Reference now may be made to FIG. 1 for a simplified representation of the mirror mechanism and to FIGS. 2 and 3 for diagramatic representations of the mode of operation. Movement of the adjusting lever 36 in a vertical direction results in the tilting of the plane of the mirror 21 about a substantially horizontal axis passing through the center of the ball 31 of the ball mount 29, see FIG. 2. Movement of the adjusting lever 36 in a substantially horizontal direction results in the tilting of the plane of the mirror about a substantially vertical axis through the center of the ball 31 of the ball mount 29, see FIG. 3. Because of the limited movement of the adjusting lever 36 in either vertical or horizontal direction, the backing plate flange 23 movement relative to the casing flange 34 is substantially parallel. Both the backing plate 22 and its flange 23 move in unison about the horizontal axis, but during movement about the vertical axis only the backing plate 22 moves about the ball 31 while its flange 23 continues to move parallel to the casing flange 34. The hinge 24 permits the swinging movement of the backing plate 22 relative to its flange 23.

During movement of the backing plate 22 on the ball 31, the coacting guide means 45 inhibits any tendency of the mirror to rotate in its own plane, thus preventing the backing plate from binding against the surrounding casing 25. A cover plate 52 conceals the ball 38 and socket 41 mounting of the lever 37 from the inside of the vehicle window 16. The mirror mechanism on the outside of the vehicle window 16 is concealed beneath on ornamental L-shaped cover 53, see FIG. 4.

As best seen in FIGS. 7 and 8, the perimeter 54 of the case plate flange 34 is configured to fit into the door frame member 13 that has a substantially U-shaped cross-section with the opening of the U facing toward the window opening. As best seen in FIG. 8, the lower base portion 55 of the case plate flange 34 is configured to receive a bolt 56 adapted to bolt the rearview mirror assembly to a pinch well flange 57 on the window sill 14 of the vehicle door. It will be understood that the matter of installation of the rearview mirror assembly may be modified to suit the configuration of the vehicle door, particularly at the corner resulting from the intersection of the door frame member 13 with the window sill 14.

It may be noted that the rearview mirror assembly 10 is disclosed as being mounted on the right front door of a vehicle. This is because the first prototype was designed for the door on the driver's side of a right hand drive vehicle. The principle features of the mirror assembly will be readily adaptable for the left side door since the major components will be mirror images of those used on the right side.

It is to be understood this invention is not limited to the exact construction illustrated and described above, but that various changes and modifications may be made without departing from the spirit and scope of the invention as defined by the following claims.

I claim:

1. A rearview mirror assembly adapted to be mounted at a forward corner of a window frame in a vehicle door, comprising:
   a mirror surface on a backing plate having an angularly related flange at one of its ends;
   the backing plate and its flange being connected to each other by a hinge means;
   a support frame encompassing the backing plate and having at one of its ends an angularly related flange having door window frame engageable means for positioning and retaining the mirror assembly on a vehicle door;
   the backing plate flange and frame flange are contiguous to each other;
   coacting ball and socket means on the support frame and the backing plate providing a pivot means about which the mirror is universally adjustable;
   an adjusting lever mounted in the support frame flange and directly coupled to the backing plate flange;
   the lever being operable from the inside of the vehicle door to tilt the mirror about substantially horizontal and vertical axes;
   and coacting guide means on the backing plate and frame flange prohibiting rotation of the mirror in its own plane about the mirror pivot means.

2. A rearview mirror assembly according to claim 1, in which:
   the backing plate with the mirror mounted thereon is swingable about the hinge means connecting it to its flange only in response to movement of the adjusting lever in a direction to tilt the mirror about one of its axes;
   the backing plate and its flange being substantially immovable relative to one another upon movement of the adjusting lever in a direction to tilt the mirror about the other of its axes.

3. A rearview mirror assembly according to claims 1 or 2, in which:
the coacting guide means on the backing plate and frame flanges are in substantially horizontal alignment with the ball and socket means supporting the backing plate on the support frame.

4. A rearview mirror assembly according to claim 3, in which:
the adjusting lever when moved in a substantially vertical direction tilts the mirror about the substantially horizontal axis and when moved in a substantially horizontal direction tilts the mirror about the substantially vertical axis.

5. A rearview mirror assembly according to claim 1, in which:
the backing plate flange is maintained in substantially parallel relationship to the frame flange during movement by the adjusting lever.

6. A rearview mirror assembly adapted to be mounted at a forward corner of a window frame in a vehicle door, comprising:
a mirror surface on a substantially rectangular plastic plate having at one edge a flange;
the plate and its flange being integral and joined by a living hinge means;
a support frame providing a casing for the plate;
the casing having at its end contiguous to the plate flange a flange having window frame engageable means for positioning and retaining the mirror assembly on a window frame;
the plate being mounted on a fixed ball mount supported on the casing;
an adjusting lever mounted for movement in a fixed socket in the casing flange and directly coupled to the plate flange;
the adjusting lever being operable to rotate the mirror on the ball mount about substantially horizontal and vertical axes;
and coacting guide means on the plate and casing prohibiting rotation of the mirror in its own plane about the fixed ball mount.

7. A rearview mirror assembly according to claim 6, in which:
movement of the adjusting lever in a direction substantially parallel to the hinge axis of the living hinge between the plate and its flange results in tilting movement of the mirror about the horizontal axis;
and movement of the adjusting lever in a direction substantially normal to the hinge axis of the living hinge results in tilting movement of the mirror about the vertical axis.

8. A rearview mirror assembly according to claims 6 or 7, in which:
the coacting guide means on the plate and casing being substantially in horizontal alignment with the axis of the ball mount normal to the plate.

9. A rearview mirror assembly according to claim 8, in which:
the coacting guide means comprises a portion of the casing flange having a horizontal slot therein and a follower carried on the plate movable within the slot.

10. A rearview mirror assembly according to claims 6 or 7, in which:
the plate flange and the casing flange are substantially triangular in shape;
and the plate flange during movement by the adjusting lever maintains a substantially parallel relationship to the casing flange.

* * * * *